United States Patent
Brettle

(10) Patent No.: US 10,643,384 B2
(45) Date of Patent: May 5, 2020

(54) MACHINE LEARNING-BASED GEOMETRIC MESH SIMPLIFICATION

(71) Applicant: Google LLC, Mountain View, CA (US)

(72) Inventor: Jamieson Brettle, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/892,113

(22) Filed: Feb. 8, 2018

(65) Prior Publication Data
US 2019/0244423 A1    Aug. 8, 2019

(51) Int. Cl.
G06T 15/00    (2011.01)
G06T 17/20    (2006.01)
G06N 3/08    (2006.01)
G06T 15/04    (2011.01)

(52) U.S. Cl.
CPC ............. *G06T 17/205* (2013.01); *G06N 3/08* (2013.01); *G06T 15/04* (2013.01)

(58) Field of Classification Search
CPC ........ G06T 17/205; G06T 15/04; G06T 17/10
USPC ......................................................... 345/419
See application file for complete search history.

(56) References Cited

U.S. PATENT DOCUMENTS

| | | | | |
|---|---|---|---|---|
| 7,280,109 B2* | 10/2007 | Hoppe | .................... | G06T 17/20 345/423 |
| 7,573,474 B2* | 8/2009 | Hoppe | .................... | G06T 17/20 345/421 |
| 7,737,969 B2* | 6/2010 | Shen | ...................... | G06T 17/20 345/419 |
| 8,237,706 B2* | 8/2012 | Lee | .......................... | G06T 17/20 345/419 |
| 8,830,235 B1* | 9/2014 | Guskov | ................. | G06T 17/205 345/420 |
| 8,928,660 B2* | 1/2015 | Choe | ...................... | G06T 9/001 345/423 |

(Continued)

OTHER PUBLICATIONS

Funkhouser, Mesh Simplification, Princeton University, COS 526, 2006, pp. 1-6.*

(Continued)

*Primary Examiner* — Phu K Nguyen
(74) *Attorney, Agent, or Firm* — Brake Hughes Bellermann LLP

(57) ABSTRACT

Techniques of simplifying triangular meshes involve performing machine learning on triangle mesh data to produce simplified triangle mesh data representing a simplified triangle mesh having a specified number of triangles. Along these lines, a computer obtains triangular mesh data representing a triangular mesh that approximates an object. For example, a triangular mesh that provides a very good approximation of a human head may have tens or hundreds of thousands of triangular faces and vertices. The computer then inputs this triangular mesh data and a specified number of triangular faces into a machine learning application. The specified number of triangular faces is much less than the number of faces in the triangular mesh data input into the machine learning application. The machine learning application, having been trained on multiple sets of triangular mesh/simplified triangular mesh data pairs, outputs simplified triangular mesh data representing a simplified triangular mesh having the specified number of sides.

21 Claims, 4 Drawing Sheets

(56) References Cited

U.S. PATENT DOCUMENTS 9,064,311 B2 * 6/2015 Mammou ............... G06T 9/004
9,171,383 B2 * 10/2015 Ahn .......................... G06T 9/00
10,043,309 B2 * 8/2018 Starhill ................... G06T 17/10

OTHER PUBLICATIONS

George D, Xie X, Tam GK. 3D Mesh Segmentation via Multi-branch 1D Convolutional Neural Networks. arXiv preprint arXiv: 1705.11050. May 2017.*

Seidel, Y. L. H. P. Neural Meshes: Surface Reconstruction with a Learning Algorithm. Oct. 2004.*

Chen J, Liu Z, Zheng Y, Zheng P, Zheng J, Xiao Z, Yu C. Automatic Sizing Functions for 3D Unstructured Mesh Generation. Procedia engineering. Jan. 1, 2017;203:245-57.*

Alvarez, et al., "A mesh optimization algorithm based on neural networks", Information Sciences, vol. 177, No. 23, pp. 5347-5364, Sep. 19. 2007, XP022258979.

Diebel, et al., "A Bayesian method for probable surface reconstruction and decimation", ACM Transactions on Graphics, vol. 25, No. 1, pp. 39-59, Jan. 2006, XP058096102.

International Search Report and Written Opinion for International Application No. PCT/US2019/016676, dated Apr. 18, 2019, 11 pages.

Yan, et al., "Adaptive 3D mesh reconstruction from dense unorganized weighted points using neural network", Proceedings of 2004 International Conference on Machine Learning and Cybernetics, IEEE, vol. 5, pp. 3238-3242, Jan. 2004, XP010760225.

* cited by examiner

MACHINE LEARNING-BASED GEOMETRIC MESH SIMPLIFICATION

TECHNICAL FIELD

This description relates to simplification of geometric meshes used to represent objects rendered on displays and, in particular, to machine learning-based geometric mesh simplification.

BACKGROUND

Some applications (e.g., video games, architectural rendering, etc.) involve representing three-dimensional objects to a user. In one example, an adventure game played by a user in a virtual reality environment may require the generation of virtual trees, rocks, and people. In another example, a mapping application may require the representation of buildings. In some applications, each such object can include a triangular mesh having a plurality of vertices, i.e., points in space that form triangles. Such a triangular mesh involves a plethora of data that may be stored on disk and transmitted to the user. Practical implementations of storing and transmitting the triangular mesh data representing a virtual object include simplifying the triangular mesh data by reducing the number of triangles.

A conventional approach to simplifying such triangular mesh data involves removing triangles from a triangular mesh represented by the triangle mesh data based on a mesh error metric between the original triangle mesh data and the simplified mesh data. For example, one such approach may take the form of an evaluation of a mesh error metric after a deletion of each vertex of the triangle mesh. Accordingly, at each step, a number of triangles having a common vertex are replaced with one of a number of new configurations of a smaller number of triangles after that common vertex is removed, such that the mesh error metric is minimized. Multiple steps of removing such vertices may result in the reduction of the number of triangles until a specified number of triangles is achieved.

SUMMARY

In one general aspect, a method can include receiving, by controlling circuitry of a computer configured to simplify information related to an object for display on a display device, triangular mesh data representing a triangular mesh, the triangular mesh including a first plurality of faces, the first plurality of faces having a number of faces and providing a first approximation of the object. The method can also include performing, by the controlling circuitry, a machine learning application operation on the triangular mesh data, to produce simplified triangular mesh data, the simplified triangular mesh data representing a simplified triangular mesh, the simplified triangular mesh including a second plurality of faces, the second plurality of faces providing a second approximation of the object and having a specified number of faces that is less than the number of faces of the first plurality of faces. The method can further include rendering, by the controlling circuitry, the simplified mesh data to display the second approximation of the object on the display device.

The details of one or more implementations are set forth in the accompanying drawings and the description below. Other features will be apparent from the description and drawings, and from the claims.

DETAILED DESCRIPTION

The above-described conventional approach to simplifying triangular mesh data consumes a heavy amount of computational resources. For example, evaluating the mesh error metric at each step in reducing the number of triangles of the mesh may take too many computations. Moreover, the amount of computation for each step may depend strongly on the starting vertex. It can be very difficult to determine which vertex at which to start for a given triangular mesh in order to minimize the amount of computation that achieves a reduction goal.

In accordance with the implementations described herein and in contrast with the above-described conventional approaches to simplifying triangular mesh data, improved techniques involve performing machine learning on triangle mesh data to produce simplified triangle mesh data representing a simplified triangle mesh having a specified number of triangles. Along these lines, a computer obtains triangular mesh data representing a triangular mesh that approximates an object. For example, a triangular mesh that provides a very good approximation of a human head may have tens or hundreds of thousands of triangular faces and vertices. The computer then can input this triangular mesh data and a specified number of triangular faces into a machine learning application. The specified number of triangular faces is much less than the number of faces in the triangular mesh data input into the machine learning application. The machine learning application, having been trained on multiple sets of triangular mesh/simplified triangular mesh data pairs, outputs simplified triangular mesh data representing a simplified triangular mesh having the specified number of sides.

Advantageously, the improved techniques described above produces more accurate results for a given number of triangles while using fewer computational resources.

Figure 1:
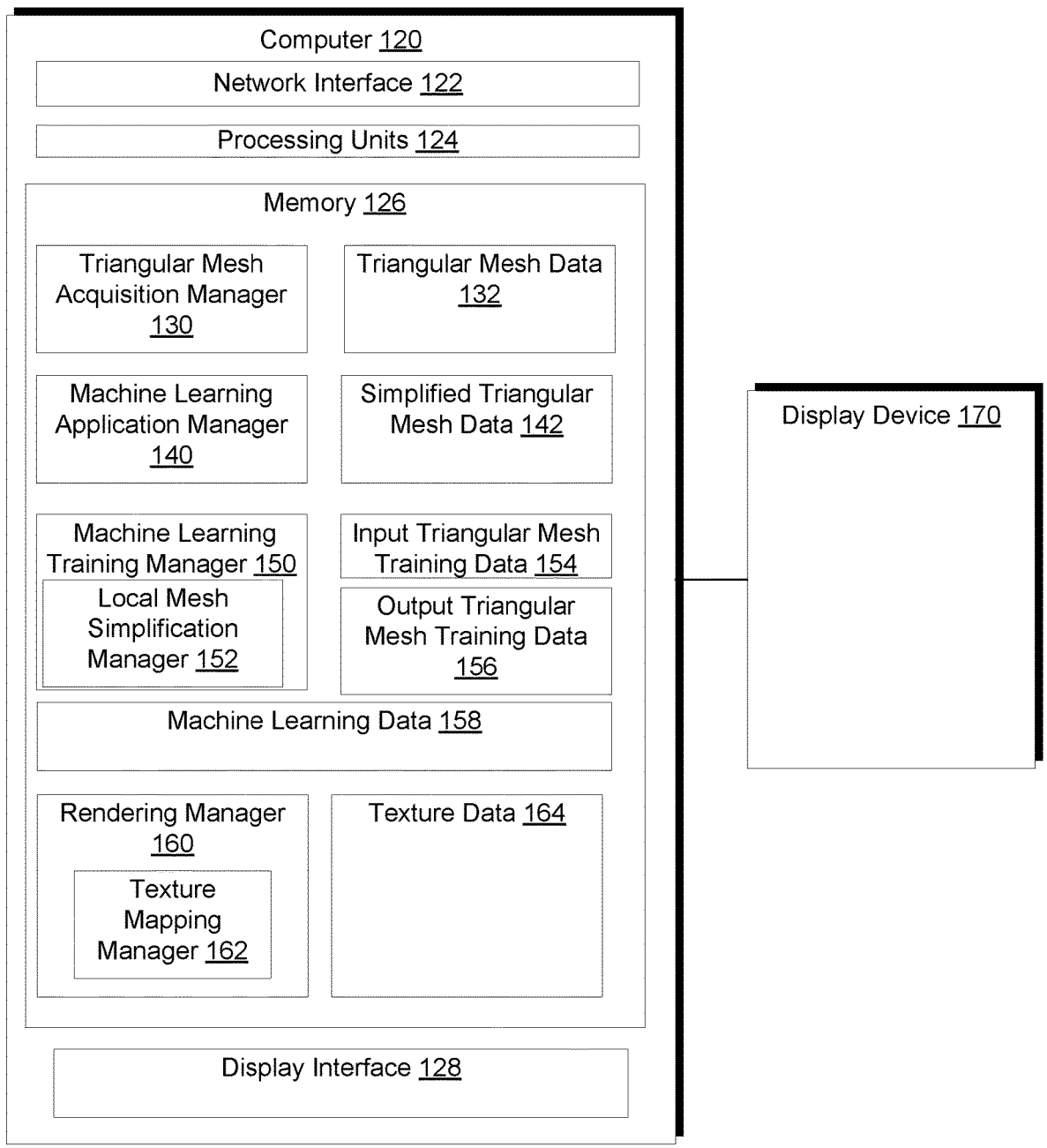
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a computer 120 and a display device 170.

The computer 120 is configured to simplify information related to an object for display on the display device 170. The computer 120 includes a network interface 122, one or more processing units 124, memory 126, and a display interface. The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein. The display interface 128 include circuitry configured to send rendered image data to the display device 170 for display to a user.

In some embodiments, one or more of the components of the computer 120 can be, or can include processors (e.g., processing units 124) configured to process instructions stored in the memory 126. Examples of such instructions as depicted in FIG. 1 include a triangular mesh acquisition manager 130, a machine learning application manager 140, a machine learning training manager 150, and a rendering manager 160. Further, as illustrated in FIG. 1, the memory 126 is configured to store various data, which is described with respect to the respective managers that use such data.

The triangular mesh acquisition manager 130 is configured to acquire triangular mesh data 132 from various sources. For example, the triangular mesh acquisition manager 130 may the triangular mesh data 132 from an optical drive or over the network interface 122. Once it acquires the triangular mesh data 132, the sound acquisition manager is also configured to store the triangular mesh data 132 in memory 126. In some implementations, the triangular mesh acquisition manager 130 streams the triangular mesh data 132 over the network interface 122.

The triangular mesh data 132 includes point data representing the vertices of the triangular faces of the triangular mesh. In some implementations, the point data includes a list of vertices, where each vertex is a triplet representing a single point in three-dimensional space. In this implementation, the vertices define the shape of each triangle of the triangular mesh as well as the orientation of that triangle in three-dimensional space. In some implementations, the point data are arranged in an ordered list through which the triangular faces may be traversed. For example, the first three vertices of the ordered list may define a first triangular face. The next vertex of the ordered list may define a second triangular face based on the previous two vertices of the ordered list, and so on.

The machine learning application manager 140 is configured to perform a machine learning application operation on the triangular mesh data 132 based on machine learning data 158. The machine learning data 158 defines a machine learning engine that takes as input the triangular mesh data 132 and produces as output simplified triangular mesh data 142. For example, the machine learning engine may be a neural network that includes a set of hidden nodes and weights. The points represented by the input triangular mesh data 132 form a layer of input nodes of the neural network. Each input node is connected to a set of hidden nodes that form a second layer of the neural network. Each connection between a hidden node and an input node may be weighted. The hidden nodes may represent particular transformation and removal operations on the points represented by the input triangular mesh data 132 to produce the points represented by the simplified triangular mesh data 142. The weights represent relative strengths, or likelihoods, of such transformation and removal operations. Further detail about such a neural network is provided with regard to FIG. 3.

The machine learning engine may take a form other than a neural network. For example, the machine learning engine may be a decision tree, deep learning, a support vector machine, and any other supervised learning system.

The simplified triangular mesh data 142 includes point data representing the vertices of the triangular faces of a simplified triangular mesh. The number of triangular faces of the simplified triangular mesh is less than the number of triangular faces of the original triangular mesh input into the machine learning engine. In some implementations, the number of triangular faces of the simplified triangular mesh is a small fraction (e.g., $\frac{1}{10}$, $\frac{1}{20}$, $\frac{1}{50}$, $\frac{1}{100}$, or smaller) of the number of triangular faces of the original triangular mesh.

In some implementations, the point data includes a list of vertices, where each vertex is a triplet representing a single point in three-dimensional space. In this implementation, the vertices define the shape of each triangle of the simplified triangular mesh as well as the orientation of that triangle in three-dimensional space. In some implementations, the point data are arranged in an ordered list through which the triangular faces may be traversed.

In some implementations, at least one vertex of the simplified triangular mesh is different than each of the vertices of the original triangular mesh. Accordingly, the machine learning data 158 not only is used to remove vertices from the triangular mesh but also moves at least some of the remaining vertices.

The machine learning training manager 150 is configured to generate the machine learning data 158 based on input triangular mesh training data 154 and output triangular mesh training data 156. In the case of the machine learning engine being a neural network, the machine learning training manager 150 generates hidden nodes and weights that best produce the output triangular mesh training data 156 from the input triangular mesh training data 154. To train an accurate machine learning engine, the input triangular mesh training data 154 and output triangular mesh training data 156 may, in some implementations, include tens or hundreds of dataset pairs.

Each dataset pair, i.e., a set of input triangular mesh training data 154 and a corresponding set of output triangular mesh training data 156. The output triangular mesh training data 156 may be derived from the set of input triangular mesh training data 154 to which the output triangular mesh training data 156 corresponds using any number of ways to generate a simplified triangular mesh. In one example, the output triangular mesh training data 156 may be generated by a user manually.

In another example, the machine learning training manager 150 includes a local mesh simplification manager 152. The local mesh simplification manager 152 is configured to automatically derive the output triangular mesh training data 156 from the input triangular mesh training data 154 to which the output triangular mesh training data 156 corresponds by minimizing a difference between the input and output triangular meshes in the region around a removed vertex.

The rendering manager 160 is configured to render the simplified triangular mesh data 142 for display on the display device 170. Upon rendering by the rendering manager 160, the simplified triangular mesh data 142 approximates the object on the display. The approximation of the object by the rendered, simplified triangular mesh data 142, while not as good as the original triangular mesh data 132, results in a recognizable representation of the object on the display device 170.

In some arrangements, the rendering manager 160 includes a texture mapping manager 162 that is configured to map an image, or texture data 164, onto the object as represented by the simplified triangular mesh data 142.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the triangular mesh acquisition manager 130 (and/or a portion thereof), the machine learning application manager 140 (and/or a portion thereof), the machine learning training manager 150 (and/or a portion thereof), and the rendering manager 160 can be a combination of a processor and a memory configured to execute instructions related to a process to implement one or more functions.

Figure 2:
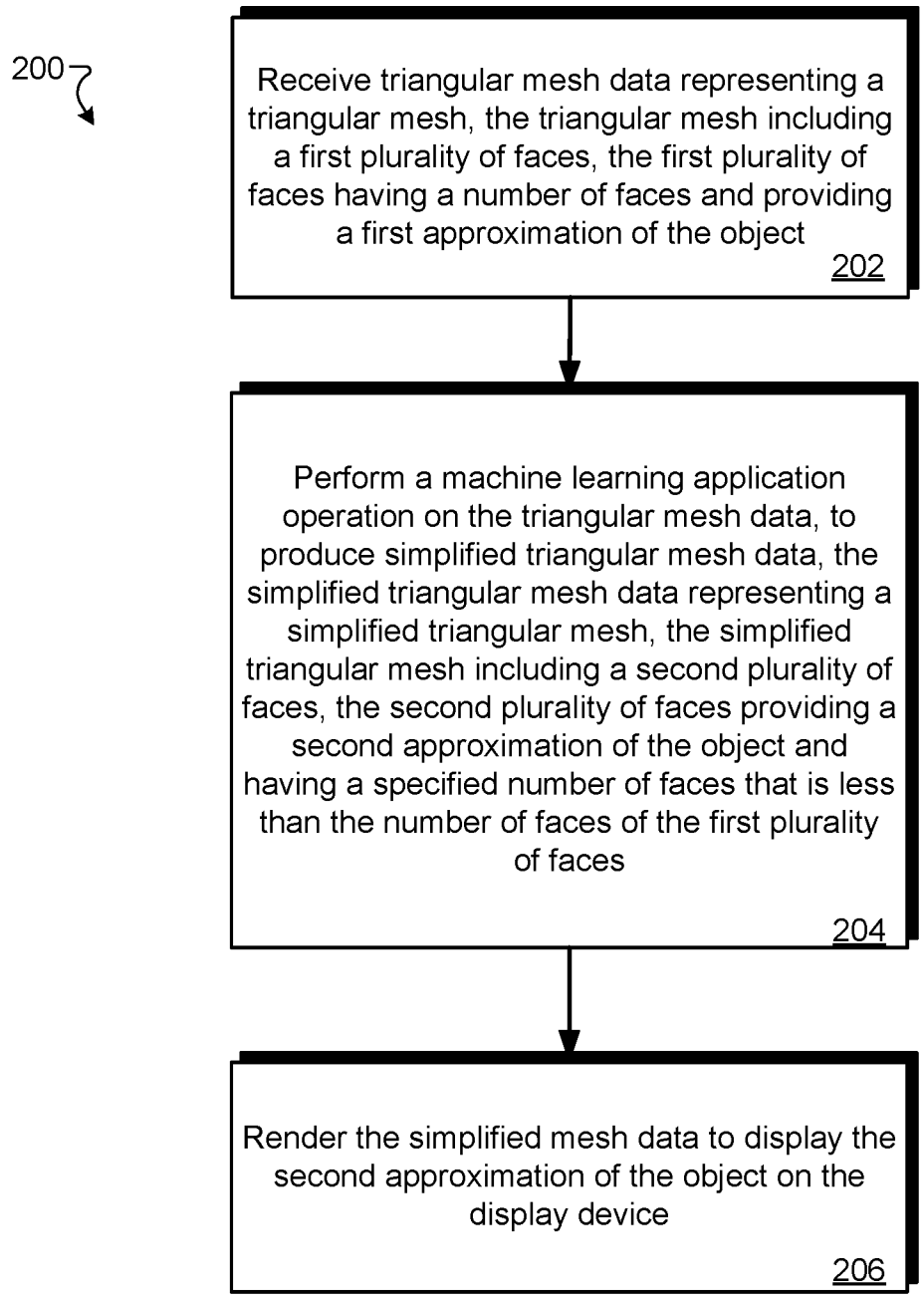
FIG. 2 is a flow chart that illustrates an example method of performing the improved techniques within the electronic environment shown in FIG. 1.

FIG. 2 is a flow chart that illustrates an example method 200 of simplify information related to an object for display on the display device 170. The method 200 may be performed by software constructs described in connection with FIG. 1, which reside in memory 126 of the point cloud compression computer 120 and are run by the set of processing units 124.

At 202, the triangular mesh acquisition manager 130 receives triangular mesh data 132 representing a triangular mesh. The triangular mesh includes a first plurality of faces. The first plurality of faces has a number of faces and provide a first approximation of the object.

At 204, the machine learning application manager 140 performs a machine learning application operation on the triangular mesh data 132 to produce simplified triangular mesh data 142. The simplified triangular mesh data 142 represents a simplified triangular mesh. The simplified triangular mesh includes a second plurality of faces, the second plurality of faces providing a second approximation of the object and having a specified number of faces that is less than the number of faces of the first plurality of faces.

At 206, the rendering manager 160 renders the simplified mesh data 142 to display the second approximation of the object on the display device 170. In some implementations, the texture mapping manager 162 maps an image represented by the texture data 164 onto the simplified mesh represented by the simplified mesh data 142.

Figure 3:
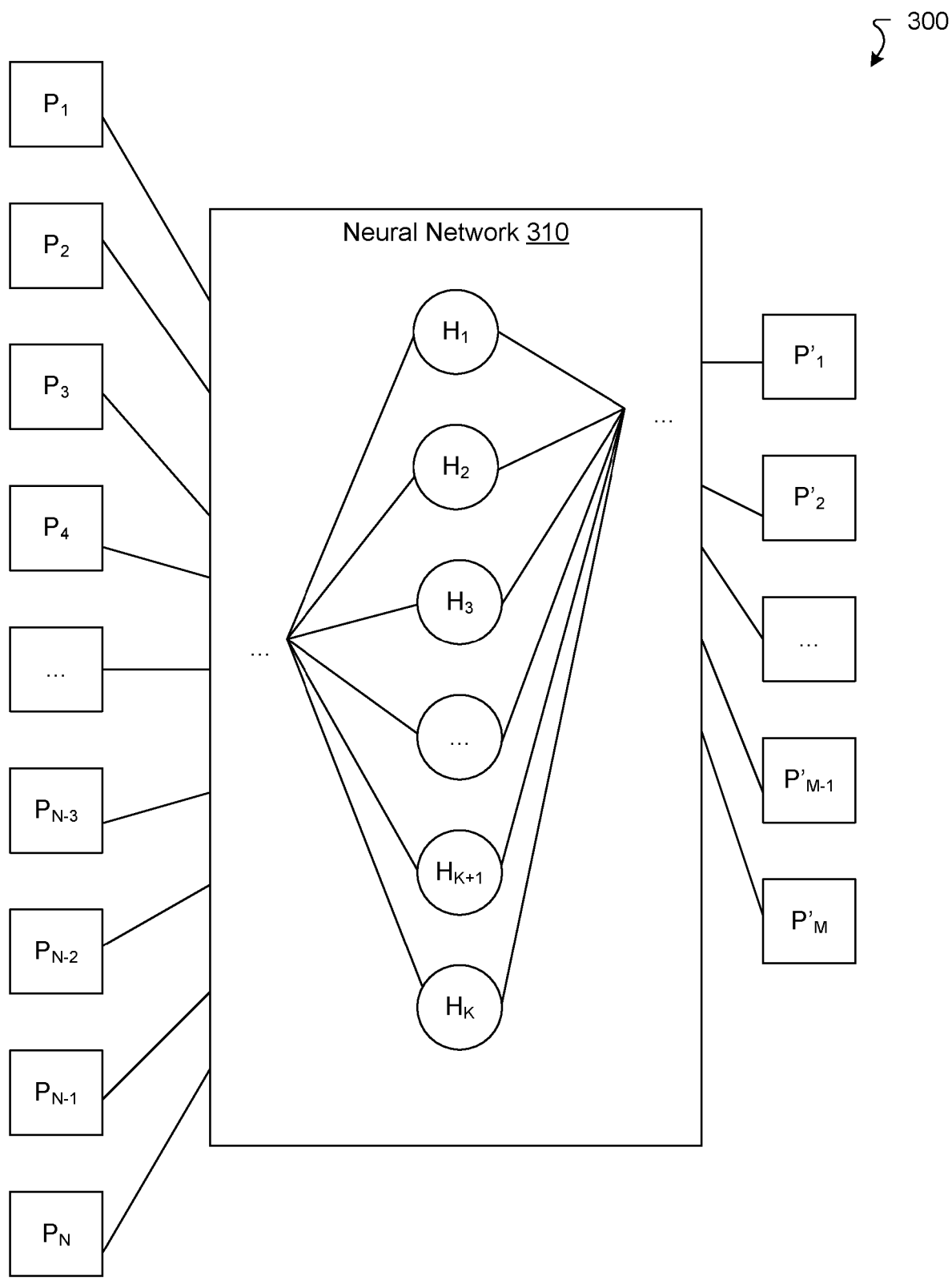
FIG. 3. is a diagram illustrating an example neural network used in generating simplified triangular meshes according to the improved techniques within the electronic environment shown in FIG. 1.

FIG. 3 is a diagram illustrating an example triangular mesh simplification 300 using a neural network 310 according to the improved techniques. In the simplification 310, a set of vertices $P_1, P_2, \ldots, P_N$ of an input triangular mesh are input into the neural network 310 and a set of vertices $P'_1, P'_2, \ldots, P'_M$ are output from the neural network 310, where M<N. In the cases illustrated herein, M can be less than N by several orders of magnitude. Further, at least one of the output vertices is different from each of the input vertices.

As shown in FIG. 3, the neural network 310 has a layer of hidden nodes $H_1, H_2, \ldots, H_K$. Further, the input to each of the hidden nodes originates from a hidden node in a previous layer. In general, each node from a previous layer may be an input into each node from a subsequent layer. As another example, each of the hidden nodes $H_1, H_2, \ldots, H_K$ is input into another node of another layer of hidden nodes.

In some implementations, each layer of hidden nodes may represent a change of a previous configuration of vertices to a current configuration of vertices of a triangular mesh resulting from a single simplification step using the local mesh simplification manager 152. For example, each of the hidden nodes of the neural network may represent a translation in space of vertices after removal of a vertex. The output layer providing the output vertices of the simplified triangular mesh would then be the result of the final simplification step.

When the neural network 310 is considered to be a graph, the edges of the graph represent a single input/output relationship between nodes of adjacent layers. In some implementations, each graph edge is associated with a weight that indicates the strength of influence of a particular translation of a simplified triangular mesh in the generation of a vertex of a subsequent simplified triangular mesh.

The machine learning training manager 150 generates the hidden nodes and weights based on the input and output training data 154 and 156. In some implementations, the translations represented by each of the hidden nodes may be specified and fixed throughout the training process. For example, if there are particular areas of an object that are to preserve the original level of detail (i.e., number of triangles), then the hidden nodes of the neural network 310 may be defined so that changes to such a particular area of the object are minimized.

Figure 4:
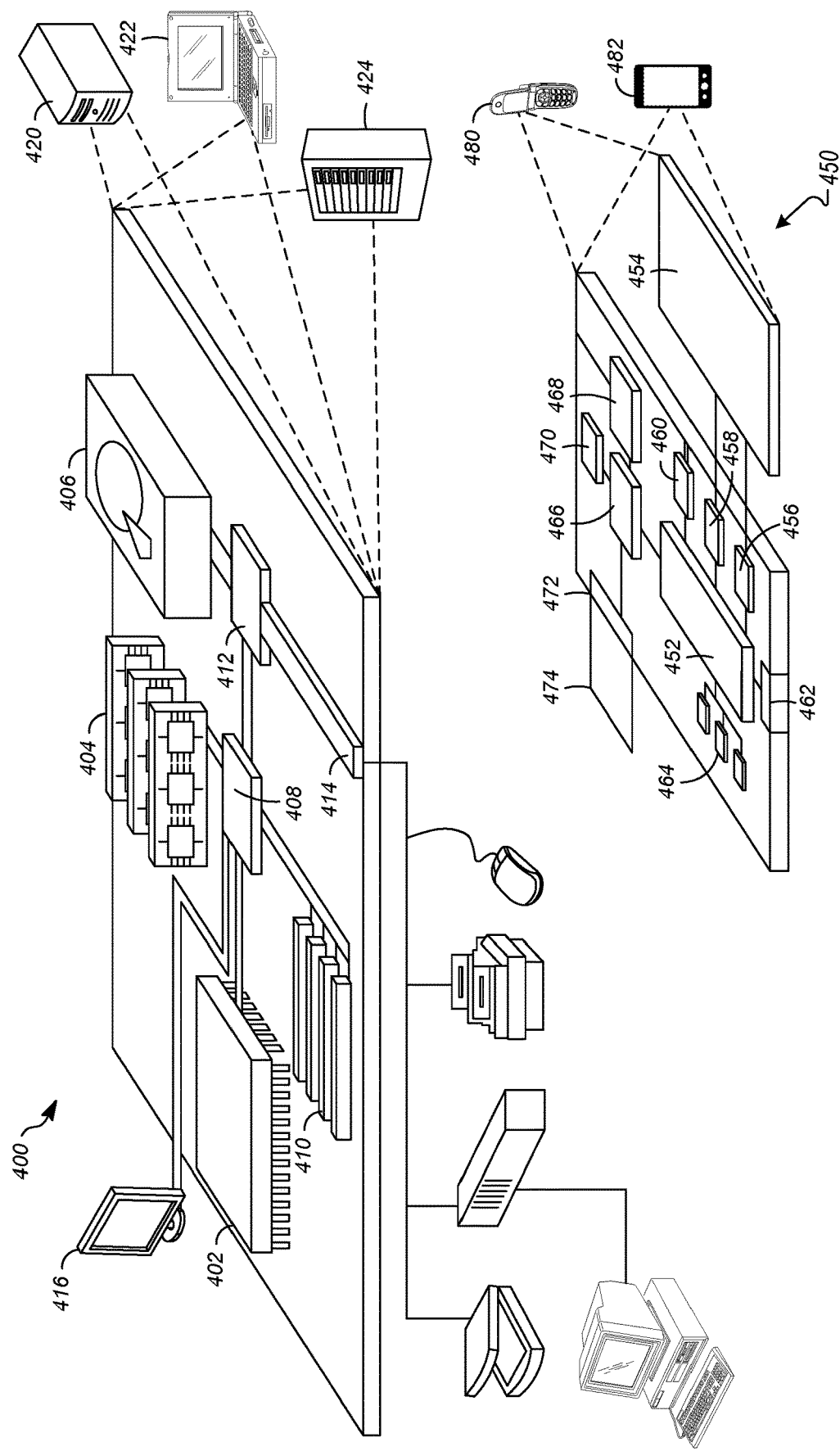
FIG. 4 illustrates an example of a computer device and a mobile computer device that can be used with circuits described here.

FIG. 4 illustrates an example of a generic computer device 400 and a generic mobile computer device 450, which may be used with the techniques described here.

As shown in FIG. 4, computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, by controlling circuitry of a computer configured to simplify information related to an object for display on a display device, (i) triangular mesh data representing a triangular mesh, the triangular mesh including a first plurality of faces, the first plurality of faces having a number of faces and providing a first approximation of the object and (ii) a specified number of faces of a simplified triangular mesh, the specified number of faces being less than the number of faces of the first plurality of faces;
performing, by the controlling circuitry, a machine learning application operation on the triangular mesh data to produce simplified triangular mesh data, the simplified triangular mesh data representing the simplified triangular mesh, the simplified triangular mesh including a second plurality of faces, the second plurality of faces providing a second approximation of the object and having the specified number of faces; and
rendering, by the controlling circuitry, the simplified mesh data to display the second approximation of the object on the display device.

2. The method as in claim 1, further comprising:
producing i) a first triangular mesh training dataset, the triangular mesh training datasets representing a triangular mesh having a first number of faces and ii) a second triangular mesh training dataset, the second triangular mesh training dataset representing a triangular mesh having a second number of faces, the second number of faces being less than the first number of faces; and
performing a machine learning training operation on the first triangular mesh training dataset and the second triangular mesh training dataset to produce machine learning data, the machine learning data defining the machine learning application operation.

3. The method as in claim 2, wherein producing the first triangular mesh training dataset and the second triangular mesh training dataset includes:
receiving the first triangular mesh training dataset, the first triangular mesh training dataset including a plurality of point data representing vertices of triangles of the triangular mesh;
performing a vertex removal operation to remove a point datum of the plurality of point data, the point datum representing a vertex of a first plurality of triangles of the triangular mesh, the first plurality of triangles having a first number of triangles; and
replacing the first plurality of triangles with a second plurality of triangles, the second plurality of triangles having a second number of triangles, the second number of triangles being less than the first number of triangles.

4. The method as in claim 3, wherein replacing the first plurality of triangles with the second plurality of triangles includes:
generating a plurality of sets of triangles having, as vertices, points represented by the point data, the points neighboring the vertex represented by the removed point datum; and
producing, as the second plurality of triangles, the set of triangles minimizing an error metric with respect to the first plurality of triangles.

5. The method as in claim 2, wherein performing the machine learning training operation on the first triangular mesh training dataset and the second triangular mesh training dataset includes:
generating, as the machine learning data, artificial neural network data including a plurality of hidden nodes and weights, the plurality of hidden nodes and weights being generated based on the first triangular mesh training dataset and the second triangular mesh training dataset.

6. The method as in claim 1, wherein the triangular mesh dataset includes a first plurality of point data representing vertices of triangles of the triangular mesh;
wherein performing the machine learning application operation on the triangular mesh data to produce the simplified triangular mesh data includes:
generating a second plurality of point data representing vertices of triangles of the simplified triangular mesh, at least one vertex represented by the second plurality of point data being different than each of the vertices represented by the first plurality of point data.

7. The method as in claim 1, wherein rendering the simplified mesh data to display the second approximation of the object on the display device includes:
applying a texture mapping of an image onto the simplified triangular mesh.

8. The method as in claim 1, wherein the machine learning operation includes a neural network operation configured to produce a neural network, the neural network being represented by a graph having edges and including layers of hidden nodes, each of the hidden nodes of a layer representing a translation in a space of vertices of a simplified triangular mesh after removal of a vertex, each graph edge representing an input/output relationship between nodes of adjacent layers and being associated with a weight that indicates a strength of influence of a translation of the simplified triangular mesh in a generation of a vertex of a subsequent, simplified triangular mesh.

9. A computer program product comprising a nontransitory storage medium, the computer program product including code that, when executed by processing circuitry of a user device configured to computer configured to simplify information related to an object for display on a display device, causes the processing circuitry to perform a method, the method comprising:
receiving (i) triangular mesh data representing a triangular mesh, the triangular mesh including a first plurality of faces, the first plurality of faces having a number of faces and providing a first approximation of the object and (ii) a specified number of faces of a simplified triangular mesh, the specified number of faces being less than the number of faces of the first plurality of faces;

performing a machine learning application operation on the triangular mesh data to produce simplified triangular mesh data, the simplified triangular mesh data representing the simplified triangular mesh, the simplified triangular mesh including a second plurality of faces, the second plurality of faces providing a second approximation of the object and having the specified number of faces; and rendering the simplified mesh data to display the second approximation of the object on the display device.

10. The computer program product as in claim 9, wherein the method further comprises:

producing i) a first triangular mesh training dataset, the triangular mesh training datasets representing a triangular mesh having a first number of faces and ii) a second triangular mesh training dataset, the second triangular mesh training dataset representing a triangular mesh having a second number of faces, the second number of faces being less than the first number of faces; and performing a machine learning training operation on the first triangular mesh training dataset and the second triangular mesh training dataset to produce machine learning data, the machine learning data defining the machine learning application operation.

11. The computer program product as in claim 10, wherein producing the first triangular mesh training dataset and the second triangular mesh training dataset includes:

receiving the first triangular mesh training dataset, the first triangular mesh training dataset including a plurality of point data representing vertices of triangles of the triangular mesh;

performing a vertex removal operation to remove a point datum of the plurality of point data, the point datum representing a vertex of a first plurality of triangles of the triangular mesh, the first plurality of triangles having a first number of triangles; and replacing the first plurality of triangles with a second plurality of triangles, the second plurality of triangles having a second number of triangles, the second number of triangles being less than the first number of triangles.

12. The computer program product as in claim 11, wherein replacing the first plurality of triangles with the second plurality of triangles includes:

generating a plurality of sets of triangles having, as vertices, points represented by the point data, the points neighboring the vertex represented by the removed point datum; and producing, as the second plurality of triangles, the set of triangles minimizing an error metric with respect to the first plurality of triangles.

13. The computer program product as in claim 10, wherein performing the machine learning training operation on the first triangular mesh training dataset and the second triangular mesh training dataset includes:

generating, as the machine learning data, artificial neural network data including a plurality of hidden nodes and weights, the plurality of hidden nodes and weights being generated based on the first triangular mesh training dataset and the second triangular mesh training dataset.

14. The computer program product as in claim 9, wherein the triangular mesh dataset includes a first plurality of point data representing vertices of triangles of the triangular mesh;

wherein performing the machine learning application operation on the triangular mesh data to produce the simplified triangular mesh data includes:

generating a second plurality of point data representing vertices of triangles of the simplified triangular mesh, at least one vertex represented by the second plurality of point data being different than each of the vertices represented by the first plurality of point data.

15. The computer program product as in claim 9, wherein rendering the simplified mesh data to display the second approximation of the object on the display device includes:

applying a texture mapping of an image onto the simplified triangular mesh.

16. An electronic apparatus configured to simplify information related to an object for display on a display device, the electronic apparatus comprising:

memory; and controlling circuitry coupled to the memory, the controlling circuitry being configured to:

receive (i) triangular mesh data representing a triangular mesh, the triangular mesh including a first plurality of faces, the first plurality of faces having a number of faces and providing a first approximation of the object and (ii) a specified number of faces of a simplified triangular mesh, the specified number of faces being less than the number of faces of the first plurality of faces;

perform a machine learning application operation on the triangular mesh data to produce simplified triangular mesh data, the simplified triangular mesh data representing the simplified triangular mesh, the simplified triangular mesh including a second plurality of faces, the second plurality of faces providing a second approximation of the object and having the specified number of faces; and render the simplified mesh data to display the second approximation of the object on the display device.

17. The electronic apparatus as in claim 16, wherein the controlling circuitry is further configured to:

produce i) a first triangular mesh training dataset, the triangular mesh training datasets representing a triangular mesh having a first number of faces and ii) a second triangular mesh training dataset, the second triangular mesh training dataset representing a triangular mesh having a second number of faces, the second number of faces being less than the first number of faces; and perform a machine learning training operation on the first triangular mesh training dataset and the second triangular mesh training dataset to produce machine learning data, the machine learning data defining the machine learning application operation.

18. The electronic apparatus as in claim 17, wherein the controlling circuitry configured to produce the first triangular mesh training dataset and the second triangular mesh training dataset is further configured to:

receive the first triangular mesh training dataset, the first triangular mesh training dataset including a plurality of point data representing vertices of triangles of the triangular mesh;

perform a vertex removal operation to remove a point datum of the plurality of point data, the point datum representing a vertex of a first plurality of triangles of the triangular mesh, the first plurality of triangles having a first number of triangles; and replace the first plurality of triangles with a second plurality of triangles, the second plurality of triangles having a second number of triangles, the second number of triangles being less than the first number of triangles.

19. The electronic apparatus as in claim 17, wherein the controlling circuitry configured to perform the machine learning training operation on the first triangular mesh training dataset and the second triangular mesh training dataset is further configured to:

generate, as the machine learning data, artificial neural network data including a plurality of hidden nodes and weights, the plurality of hidden nodes and weights being generated based on the first triangular mesh training dataset and the second triangular mesh training dataset.

20. The electronic apparatus as in claim 16, wherein the triangular mesh dataset includes a first plurality of point data representing vertices of triangles of the triangular mesh;

wherein the controlling circuitry configured to perform the machine learning application operation on the triangular mesh data to produce the simplified triangular mesh data is further configured to:

generate a second plurality of point data representing vertices of triangles of the simplified triangular mesh, at least one vertex represented by the second plurality of point data being different than each of the vertices represented by the first plurality of point data.

21. The electronic apparatus as in claim 16, wherein the controlling circuitry configured to render the simplified mesh data to display the second approximation of the object on the display device is further configured to:

apply a texture mapping of an image onto the simplified triangular mesh.

* * * * *